US011673605B2

(12) United States Patent
Gieseke et al.

(10) Patent No.: US 11,673,605 B2
(45) Date of Patent: *Jun. 13, 2023

(54) VEHICULAR DRIVING ASSIST SYSTEM

(71) Applicant: Magna Electronics Inc., Auburn Hills, MI (US)

(72) Inventors: Achim Gieseke, Gross-Umstadt (DE); Ralph Latotzki, Hamburg (DE); Ruediger Boegel, Grossostheim (DE)

(73) Assignee: Magna Electronics Inc., Auburn Hills, MI (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/247,689

(22) Filed: Dec. 21, 2020

(65) Prior Publication Data
US 2021/0107561 A1  Apr. 15, 2021

Related U.S. Application Data

(63) Continuation of application No. 16/147,946, filed on Oct. 1, 2018, now Pat. No. 10,870,449, which is a (Continued)

(51) Int. Cl.
*B62D 13/06* (2006.01)
*B60W 30/09* (2012.01)
(Continued)

(52) U.S. Cl.
CPC ............... *B62D 13/06* (2013.01); *B60R 1/00* (2013.01); *B60W 30/09* (2013.01);
(Continued)

(58) Field of Classification Search
CPC ....... B60W 2300/14; B60W 2300/806; B60W 2300/8086; B60W 2300/8093;
(Continued)

(56) References Cited

U.S. PATENT DOCUMENTS 5,177,685 A    1/1993  Davis et al.
5,182,502 A    1/1993  Slotkowski et al.
(Continued)

FOREIGN PATENT DOCUMENTS

CA    2626334 A1    9/2008
CN    103625466 A  *  3/2014   ............ B60W 30/06
(Continued)

OTHER PUBLICATIONS

Morales, et al.; Driver Assistance System for Passive Multi-Trailer Vehicles with Haptic Steering Limitations on the Leading Unit; Apr. 3, 2013; Sensors (Basel) April ed.; pp. 4486-4495 (https://www.ncbi.nlm.nih.gov/pmc/articles/PMC3673095/) (Year: 2013).*

*Primary Examiner* — Atul Trivedi
(74) *Attorney, Agent, or Firm* — Honigman LLP

(57) ABSTRACT

A vehicular driving assist system includes a plurality of cameras disposed at a vehicle and an image processor that processes captured image data. With a trailer equipped with at least one trailer camera hitched to the vehicle, a display screen displays video images derived from captured image data. The system determines a reversing path for the vehicle and trailer to follow to assist the driver in backing up the trailer, and generates a graphic overlay at the display screen that indicates the determined reversing path. During the backing up maneuver of the trailer hitched to the vehicle, and responsive to determination of an object rearward of the trailer, the system (i) determines an adjusted reversing path to avoid the object and (ii) adjusts the graphic overlay to indicate the adjusted reversing path of the vehicle and trailer for the driver to follow in backing up the trailer.

23 Claims, 4 Drawing Sheets

Related U.S. Application Data continuation of application No. 15/238,005, filed on Aug. 16, 2016, now Pat. No. 10,086,870.

(60) Provisional application No. 62/206,443, filed on Aug. 18, 2015.

(51) Int. Cl.
  B60R 1/00 (2022.01)
  B62D 15/02 (2006.01)
(52) U.S. Cl.
  CPC .... B62D 15/0295 (2013.01); *B60R 2300/806* (2013.01); *B60R 2300/8086* (2013.01); *B60R 2300/8093* (2013.01)
(58) Field of Classification Search
  CPC .......... B60W 2420/42; B60W 10/184; B60W 10/20; B60W 30/06; B60W 30/09; B60W 2520/06; B62D 15/0295; B62D 13/06; B60R 1/00
  USPC .......................................................... 701/48
  See application file for complete search history.

(56) References Cited

U.S. PATENT DOCUMENTS

| | | |
|---|---|---|
| 5,184,956 A | 2/1993 | Langlais et al. |
| 5,189,561 A | 2/1993 | Hong |
| 5,193,000 A | 3/1993 | Lipton et al. |
| 5,208,701 A | 5/1993 | Maeda |
| 5,245,422 A | 9/1993 | Borcherts et al. |
| 5,276,389 A | 1/1994 | Levers |
| 5,289,182 A | 2/1994 | Brillard et al. |
| 5,305,012 A | 4/1994 | Faris |
| 5,307,136 A | 4/1994 | Saneyoshi |
| 5,309,137 A | 5/1994 | Kajiwara |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,420 A | 6/1996 | Tsuchiya et al. |
| 5,535,314 A | 7/1996 | Alves et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,675,489 A | 10/1997 | Pomerleau |
| 5,677,851 A | 10/1997 | Kingdon et al. |
| 5,699,044 A | 12/1997 | Van Lente et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,940,120 A | 8/1999 | Frankhouse et al. |
| 5,949,331 A | 9/1999 | Schofield et al. |
| 5,956,181 A | 9/1999 | Lin |
| 5,959,555 A | 9/1999 | Furuta |
| 5,963,247 A | 10/1999 | Banitt |
| 5,964,822 A | 10/1999 | Alland et al. |
| 5,990,649 A | 11/1999 | Nagao et al. |
| 6,009,336 A | 12/1999 | Harris et al. |
| 6,020,704 A | 2/2000 | Buschur |
| 6,084,519 A | 7/2000 | Coulling et al. |
| 6,116,743 A | 9/2000 | Hoek |
| 6,144,022 A | 11/2000 | Tenenbaum et al. |
| 6,175,300 B1 | 1/2001 | Kendrick |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |
| 6,370,329 B1 | 4/2002 | Teuchert |
| 6,411,204 B1 | 6/2002 | Bloomfield et al. |
| 6,411,328 B1 | 6/2002 | Franke et al. |
| 6,424,273 B1 | 7/2002 | Gutta et al. |
| 6,430,303 B1 | 8/2002 | Naoi et al. |

(56) References Cited

U.S. PATENT DOCUMENTS

| | | |
|---|---|---|
| 6,433,817 B1 | 8/2002 | Guerra |
| 6,442,465 B2 | 8/2002 | Breed et al. |
| 6,480,104 B1 | 11/2002 | Wall et al. |
| 6,483,429 B1 | 11/2002 | Yasui et al. |
| 6,497,503 B1 | 12/2002 | Dassanayake et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,559,761 B1 | 5/2003 | Miller et al. |
| 6,574,033 B1 | 6/2003 | Chui et al. |
| 6,578,017 B1 | 6/2003 | Ebersole et al. |
| 6,589,625 B1 | 7/2003 | Kothari et al. |
| 6,594,583 B2 | 7/2003 | Ogura et al. |
| 6,631,994 B2 | 10/2003 | Suzuki et al. |
| 6,636,258 B2 | 10/2003 | Strumolo |
| 6,672,731 B2 | 1/2004 | Schnell et al. |
| 6,678,056 B2 | 1/2004 | Downs |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,721,659 B2 | 4/2004 | Stopczynski |
| 6,735,506 B2 | 5/2004 | Breed et al. |
| 6,744,353 B2 | 6/2004 | Sjonell |
| 6,762,867 B2 | 7/2004 | Lippert et al. |
| 6,795,221 B1 | 9/2004 | Urey |
| 6,823,241 B2 | 11/2004 | Shirato et al. |
| 6,909,753 B2 | 6/2005 | Meehan et al. |
| 6,975,775 B2 | 12/2005 | Rykowski et al. |
| 7,062,300 B1 | 6/2006 | Kim |
| 7,065,432 B2 | 6/2006 | Moisel et al. |
| 7,085,637 B2 | 8/2006 | Breed et al. |
| 7,092,548 B2 | 8/2006 | Laumeyer et al. |
| 7,116,246 B2 | 10/2006 | Winter et al. |
| 7,133,661 B2 | 11/2006 | Hatae et al. |
| 7,158,015 B2 | 1/2007 | Rao et al. |
| 7,202,776 B2 | 4/2007 | Breed |
| 7,227,611 B2 | 6/2007 | Hull et al. |
| 7,375,803 B1 | 5/2008 | Bamji |
| 7,483,058 B1 | 1/2009 | Frank et al. |
| 7,541,743 B2 | 6/2009 | Salmeen et al. |
| 7,633,383 B2 | 12/2009 | Dunsmoir et al. |
| 7,639,149 B2 | 12/2009 | Katoh |
| 7,676,087 B2 | 3/2010 | Dhua et al. |
| 7,690,737 B2 | 4/2010 | Lu |
| 7,843,451 B2 | 11/2010 | Lafon |
| 7,855,778 B2 | 12/2010 | Yung et al. |
| 7,881,496 B2 | 2/2011 | Camilleri et al. |
| 7,930,160 B1 | 4/2011 | Hosagrahara et al. |
| 8,010,252 B2 | 8/2011 | Getman et al. |
| 8,017,898 B2 | 9/2011 | Lu et al. |
| 8,063,752 B2 | 11/2011 | Oleg |
| 8,094,170 B2 | 1/2012 | Kato et al. |
| 8,164,628 B2 | 4/2012 | Stein et al. |
| 8,218,007 B2 | 7/2012 | Lee et al. |
| 8,224,031 B2 | 7/2012 | Saito |
| 8,260,518 B2 | 9/2012 | Englert |
| 8,411,998 B2 | 4/2013 | Huggett et al. |
| 8,930,140 B2 * | 1/2015 | Trombley ................ B60R 1/00 701/28 |
| 9,085,261 B2 | 7/2015 | Lu et al. |
| 9,102,271 B2 * | 8/2015 | Trombley .............. B62D 13/06 |
| 9,193,302 B2 | 11/2015 | Schofield et al. |
| 9,233,645 B2 | 1/2016 | Schofield et al. |
| 9,248,858 B2 * | 2/2016 | Lavoie ................ B62D 15/027 |
| 9,495,876 B2 | 11/2016 | Lu et al. |
| 9,506,774 B2 | 11/2016 | Shutko et al. |
| 9,566,911 B2 * | 2/2017 | Greenwood ........... H04N 7/183 |
| 9,631,936 B2 | 4/2017 | Shashua et al. |
| 9,637,053 B2 | 5/2017 | Schofield et al. |
| 9,708,000 B2 | 7/2017 | Hafner et al. |
| 9,802,542 B2 | 10/2017 | Lu et al. |
| 9,926,008 B2 * | 3/2018 | Hafner .................. B62D 13/06 |
| 9,969,428 B2 | 5/2018 | Hafner et al. |
| 10,011,211 B1 | 7/2018 | Gutierrez et al. |
| 10,086,870 B2 | 10/2018 | Gieseke et al. |
| 10,780,752 B1 * | 9/2020 | Niewiadomski ......... B60D 1/62 |
| 10,870,449 B2 | 12/2020 | Gieseke et al. |
| 2001/0001563 A1 | 5/2001 | Tomaszewski |
| 2002/0003571 A1 | 1/2002 | Schofield et al. |
| 2002/0113873 A1 | 8/2002 | Williams |
| 2003/0137586 A1 | 7/2003 | Lewellen |
| 2003/0222982 A1 | 12/2003 | Hamdan et al. |
| 2005/0237385 A1 | 10/2005 | Kosaka et al. |
| 2006/0103727 A1 | 5/2006 | Tseng |
| 2006/0250501 A1 | 11/2006 | Wildmann et al. |
| 2007/0104476 A1 | 5/2007 | Yasutomi et al. |
| 2007/0242339 A1 | 10/2007 | Bradley |
| 2008/0147321 A1 | 6/2008 | Howard et al. |
| 2008/0231701 A1 | 9/2008 | Greenwood et al. |
| 2009/0113509 A1 | 4/2009 | Tseng et al. |
| 2009/0143967 A1 | 6/2009 | Lee et al. |
| 2012/0045112 A1 | 2/2012 | Lundblad et al. |
| 2012/0218412 A1 | 8/2012 | Dellantoni et al. |
| 2012/0265416 A1 | 10/2012 | Lu et al. |
| 2012/0271515 A1 | 10/2012 | Rhode et al. |
| 2013/0231825 A1 | 9/2013 | Chundrlik, Jr. et al. |
| 2013/0268160 A1 | 10/2013 | Trombley et al. |
| 2013/0278769 A1 | 10/2013 | Nix et al. |
| 2013/0314503 A1 | 11/2013 | Nix et al. |
| 2014/0012465 A1 | 1/2014 | Shank et al. |
| 2014/0052337 A1 | 2/2014 | Lavoie et al. |
| 2014/0058614 A1 | 2/2014 | Trombley et al. |
| 2014/0058655 A1 | 2/2014 | Trombley et al. |
| 2014/0058668 A1 | 2/2014 | Trombley et al. |
| 2014/0085472 A1 | 3/2014 | Lu et al. |
| 2014/0160276 A1 * | 6/2014 | Pliefke ............... B62D 15/0295 348/118 |
| 2014/0188344 A1 | 7/2014 | Lavoie |
| 2014/0188346 A1 | 7/2014 | Lavoie |
| 2014/0200759 A1 | 7/2014 | Lu et al. |
| 2014/0210456 A1 | 7/2014 | Crossman |
| 2014/0218529 A1 | 8/2014 | Mahmoud et al. |
| 2014/0249691 A1 | 9/2014 | Hafner et al. |
| 2014/0249723 A1 | 9/2014 | Pilutti et al. |
| 2014/0267688 A1 * | 9/2014 | Aich ..................... B60W 30/00 348/113 |
| 2014/0267689 A1 * | 9/2014 | Lavoie .................. B60W 10/18 348/113 |
| 2014/0297128 A1 * | 10/2014 | Lavoie ............ B60W 30/18036 701/41 |
| 2014/0297129 A1 * | 10/2014 | Lavoie .................. G01B 21/02 701/41 |
| 2014/0303847 A1 * | 10/2014 | Lavoie .............. B62D 15/0275 701/41 |
| 2014/0303849 A1 * | 10/2014 | Hafner .................. B62D 13/06 701/1 |
| 2014/0309884 A1 * | 10/2014 | Wolf .................. B62D 15/0265 701/41 |
| 2014/0309887 A1 * | 10/2014 | Lavoie .................. B60W 50/14 701/41 |
| 2014/0309888 A1 * | 10/2014 | Smit .................. B60W 30/045 701/41 |
| 2014/0313335 A1 | 10/2014 | Koravadi |
| 2014/0324295 A1 * | 10/2014 | Lavoie .................. B60W 50/14 701/41 |
| 2014/0343793 A1 * | 11/2014 | Lavoie ............ B60W 30/18036 701/41 |
| 2014/0358417 A1 * | 12/2014 | Lavoie ................ B62D 15/027 701/300 |
| 2014/0358429 A1 | 12/2014 | Shutko et al. |
| 2014/0379217 A1 * | 12/2014 | Rupp .................... B62D 13/06 701/41 |
| 2015/0002670 A1 * | 1/2015 | Bajpai ..................... B60R 1/00 348/148 |
| 2015/0066296 A1 * | 3/2015 | Trombley .............. B62D 13/06 701/41 |
| 2015/0120141 A1 * | 4/2015 | Lavoie .................. B60W 30/06 701/41 |
| 2015/0151725 A1 | 6/2015 | Clarke et al. |
| 2015/0158527 A1 * | 6/2015 | Hafner .................. B60D 1/245 701/41 |

(56) References Cited

U.S. PATENT DOCUMENTS

| | | | |
|---|---|---|---|
| 2015/0178576 A1 | 6/2015 | Gupta | |
| 2015/0197281 A1* | 7/2015 | Miller | B60D 1/245 |
| | | | 701/41 |
| 2015/0203156 A1* | 7/2015 | Hafner | G08G 1/143 |
| | | | 701/36 |
| 2015/0210317 A1* | 7/2015 | Hafner | B62D 13/06 |
| | | | 701/41 |
| 2015/0217693 A1 | 8/2015 | Pliefke et al. | |
| 2015/0251693 A1* | 9/2015 | Lavoie | G06F 3/017 |
| | | | 701/41 |
| 2015/0344028 A1 | 12/2015 | Gieseke et al. | |
| 2015/0367886 A1* | 12/2015 | Lavoie | B62D 13/06 |
| | | | 701/41 |
| 2016/0023526 A1* | 1/2016 | Lavoie | B62D 15/027 |
| | | | 701/41 |
| 2016/0031482 A1* | 2/2016 | Lavoie | B60W 30/18036 |
| | | | 701/41 |
| 2016/0039456 A1* | 2/2016 | Lavoie | B62D 15/027 |
| | | | 701/41 |
| 2016/0052548 A1 | 2/2016 | Singh et al. | |
| 2017/0050672 A1* | 2/2017 | Gieseke | B62D 15/0295 |
| 2017/0123431 A1* | 5/2017 | Ghneim | G06V 20/56 |
| 2017/0240204 A1* | 8/2017 | Raad | B62D 15/021 |
| 2017/0253237 A1* | 9/2017 | Diessner | B60W 10/04 |
| 2017/0297619 A1* | 10/2017 | Lavoie | B62D 15/024 |
| 2017/0297620 A1* | 10/2017 | Lavoie | B62D 13/06 |
| 2017/0313351 A1* | 11/2017 | Lavoie | B62D 13/06 |
| 2018/0001928 A1* | 1/2018 | Lavoie | B62D 15/021 |
| 2018/0043933 A1* | 2/2018 | Hu | G06V 20/56 |
| 2018/0081370 A1* | 3/2018 | Miller | G05D 1/0246 |
| 2018/0215382 A1* | 8/2018 | Gupta | G08G 1/166 |
| 2018/0251153 A1* | 9/2018 | Li | B62D 15/0285 |
| 2018/0312022 A1* | 11/2018 | Mattern | B62D 15/0285 |
| 2018/0346024 A1* | 12/2018 | Lavoie | B62D 15/027 |
| 2019/0009815 A1* | 1/2019 | Lavoie | B62D 13/06 |
| 2019/0016382 A1* | 1/2019 | Zarco | G05D 1/0212 |
| 2019/0039649 A1 | 2/2019 | Gieseke et al. | |
| 2019/0064831 A1* | 2/2019 | Gali | G05D 1/0214 |
| 2019/0086204 A1* | 3/2019 | Critchley | G01S 13/88 |
| 2019/0210418 A1* | 7/2019 | Hall | B60D 1/245 |
| 2019/0275941 A1 | 9/2019 | Lu et al. | |
| 2019/0276078 A1* | 9/2019 | Pourrezaei Khaligh | |
| | | | B62D 15/0295 |
| 2019/0337344 A1* | 11/2019 | Yu | B62D 15/0285 |
| 2019/0339708 A1* | 11/2019 | Ramirez Llanos | B60R 1/003 |
| 2019/0340787 A1* | 11/2019 | Ramirez Llanos | B60D 1/62 |
| 2020/0017143 A1* | 1/2020 | Gali | G06T 7/70 |
| 2020/0086702 A1* | 3/2020 | Ling | B62D 15/0285 |
| 2020/0097021 A1* | 3/2020 | Carpenter | G05D 1/0225 |
| 2020/0164919 A1* | 5/2020 | Cotter | B62D 15/025 |
| 2020/0255066 A1* | 8/2020 | Niewiadomski | B62D 15/025 |
| 2020/0391744 A1* | 12/2020 | Niewiadomski | |
| | | | B60W 30/18109 |
| 2021/0009143 A1* | 1/2021 | Niewiadomski | B62D 15/0285 |
| 2021/0061281 A1* | 3/2021 | Niewiadomski | B60W 50/14 |
| 2021/0078634 A1* | 3/2021 | Jalalmaab | B62D 15/0285 |
| 2021/0380109 A1* | 12/2021 | Pourrezaei Khaligh | |
| | | | B62D 15/0275 |
| 2021/0403087 A1* | 12/2021 | Mayer | B62D 15/0285 |

FOREIGN PATENT DOCUMENTS

| | | | | |
|---|---|---|---|---|
| CN | 103963781 A | * | 8/2014 | B62D 13/06 |
| CN | 113386783 A | * | 9/2021 | B60R 1/003 |
| DE | 102014201841 A1 | * | 8/2014 | B62D 13/06 |
| DE | 102014222032 A1 | * | 4/2015 | B60D 1/06 |
| DE | 102014222048 A1 | * | 4/2015 | B60R 1/00 |
| DE | 102019130100 A1 | * | 5/2020 | B60D 1/06 |
| DE | 102019130496 A1 | * | 5/2020 | B62D 13/06 |
| EP | 2988983 B1 | * | 10/2020 | B60D 1/245 |
| WO | 2009006529 A1 | | 1/2009 | |
| WO | 2012103193 A1 | | 8/2012 | |
| WO | WO-2013070539 A1 | * | 5/2013 | B60R 1/00 |
| WO | WO-2013081984 A1 | * | 6/2013 | B60R 1/00 |
| WO | WO-2013086249 A2 | * | 6/2013 | G06T 15/00 |

* cited by examiner

VEHICULAR DRIVING ASSIST SYSTEM

CROSS REFERENCE TO RELATED APPLICATIONS

The present application is a continuation of U.S. patent application Ser. No. 16/147,946, filed Oct. 1, 2018, now U.S. Pat. No. 10,870,449, which is a continuation of U.S. patent application Ser. No. 15/238,005, filed Aug. 16, 2016, now U.S. Pat. No. 10,086,870, which claims the filing benefits of U.S. provisional application Ser. No. 62/206,443, filed Aug. 18, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle to assist a driver of the vehicle in maneuvering the vehicle with a trailer.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

In some systems, when attaching a trailer to the vehicle, the driver has to enter its properties to put the trailer driving aid system into a position to properly calculate the driving aids overlays, when backing up with a trailer attached. Some more advanced systems are able to detect the trailer length and the distance of the trailer's axle to the hatch by watching the trailer's turning behavior when the vehicle and trailer are in motion using visual data processing such as described in U.S. Publication No. US-2014-0160276, which is hereby incorporated herein by reference in its entirety.

Wireless camera data transmission is known, especially BLUETOOTH® and WLAN. To attach wireless cameras onto vehicles or trailers is also known. Analog image transmission (such as NTSC) to an aftermarket display device installed in the vehicle cabin is common use. In U.S. Publication No. US-2014-0340510, which is hereby incorporated herein by reference in its entirety, the integration of a trailer attached (possibly wireless) camera to an OEM vehicle (possibly top view) vision system is described including the data transmission architecture and the visual human interface. A towing vehicle based trailer stability control is well described in U.S. Publication No. US-2014-0340510.

From German DE 102009057996 (Daimler 2009), it is known how to calibrate a trailer rear-mounted camera relative to a trailing vehicle by visual motion flow analysis via difference image data processing, resulting in a corresponding set of translation and rotation parameters.

In WO 2015/001066, a vehicle trailer back up control system with trailer cameras is disclosed that is able to determine a target route (path plan) with route corridor. Also suggested is 3D representation of the scene. It lacks on describing the according vision processing and camera calibration to do so.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, with the vehicle towing a trailer that includes one or more cameras, and with the system providing enhanced maneuvering of the vehicle and trailer, such as in a reversing direction for parking a trailer.

The present invention provides a vehicle and trailer destination or parking lot determination system having a path planning algorithm and vehicle-trailer train control within a vehicle environment processed by a scene understanding system using environmental sensors and sensor fusion algorithms. The vehicle-trailer train control system utilizes visual trailer identifying and angle detection and processing algorithms. The vehicle-trailer train path planning uses a two stage path planner having a geometric planning with consecutive optimal control minimization algorithm. The environmental scene understanding system uses classifiers for the sensor clustering and input waging with a consecutive classifier based context determination algorithm.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
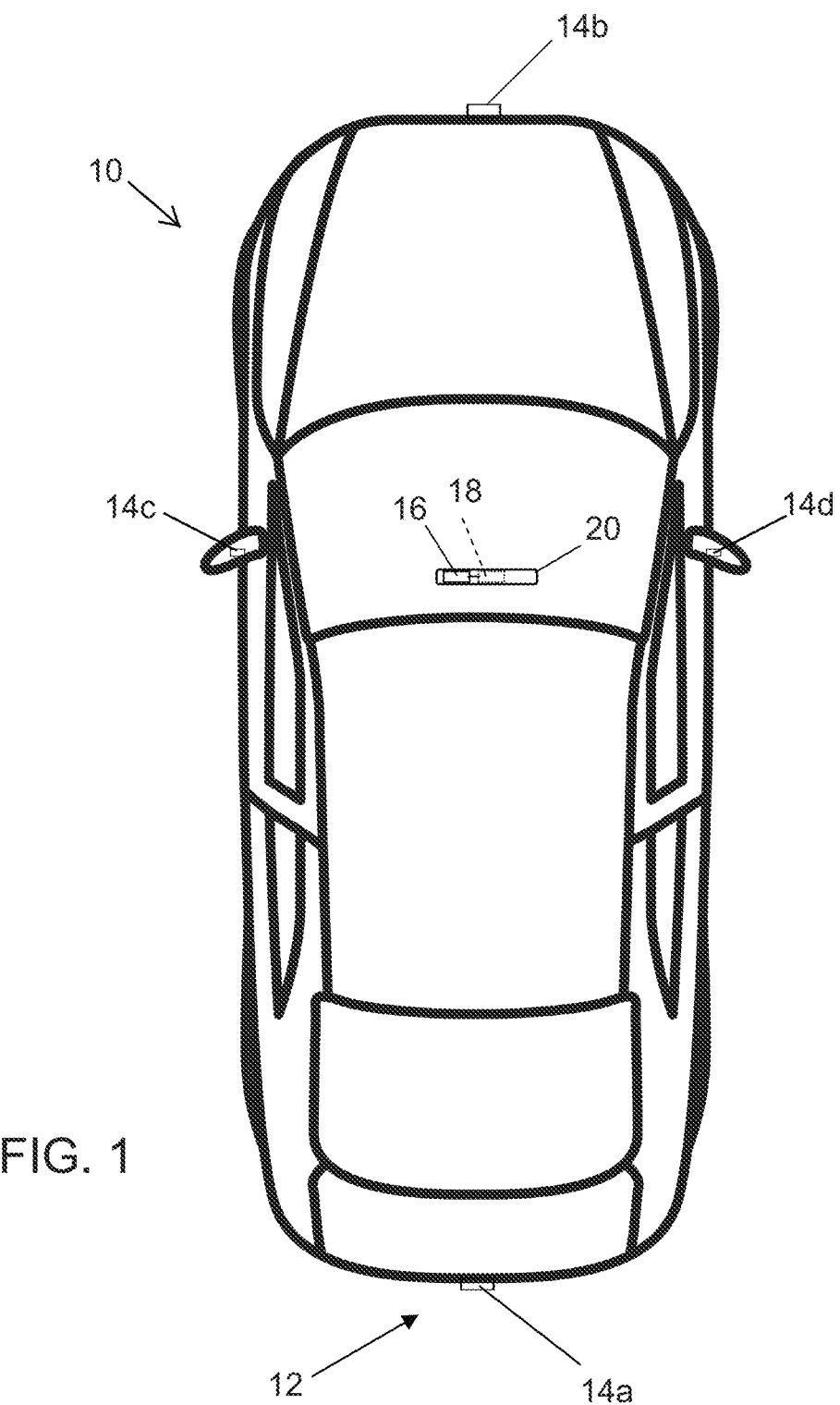
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides a driver assist system that assist the driver in backing up a trailer hooked to the rear of the towing vehicle. The system may utilize aspects of the systems described in U.S. Pat. No. 9,085,261 and/or U.S. Publication Nos. US-2015-0042808; US-2015-0042807; US-2015-0042806; US-2015-0002670; US-2014-0336876; US-2014-0160291; US-2014-0160276 and/or US-2014-0067206, and/or International Publication No. WO 2014/204794, which are hereby incorporated herein by reference in their entireties.

Under use of a trailer camera calibration algorithm similar to such as suggested in DE 102009057996, optionally utilizing methods such as described in U.S. Publication No. US-2014-0160276, one or multiple trailer mounted cameras may be calibratable to the vehicle sensor processing and vision system of the towing (ego-) vehicle's coordinate system, by processing the motion flow visual of the camera or sensor in relation to the motion flow of the vehicle sensor system. The coordinate system may be grid based or may be a vector map or a hybrid with grid maps for the near area and vector based in further distance (such as described in U.S. Publication No. US-2015-0344028, which is hereby incorporated herein by reference in its entirety). As an additional aspect of the invention, the vehicle towed trailer camera or cameras or optional other distance sensor or sensors, such as an ultrasound sensor or ultrasound array sensor, RADAR, Time-of-Flight (TOF) or LIDAR or the like, may be fused to the vehicle environmental map system as additional sensor input fused by the (Baysien, Adaboost or other type) classifier in the same manner as the comparable other sensor inputs to the 'Environment and Object map' of the sensor fusion, such as by utilizing aspects of the systems described in U.S. Publication No. US-2015-0344028. Also similar to U.S. Publication No. US-2015-0344028, the sensor(s) may have a n-1 feedback loop piping in one preceding frame or sensor sample of that same sensor and may have a static input describing the specific sensor properties (at the given point of time n) to the classifier.

Figure 3:
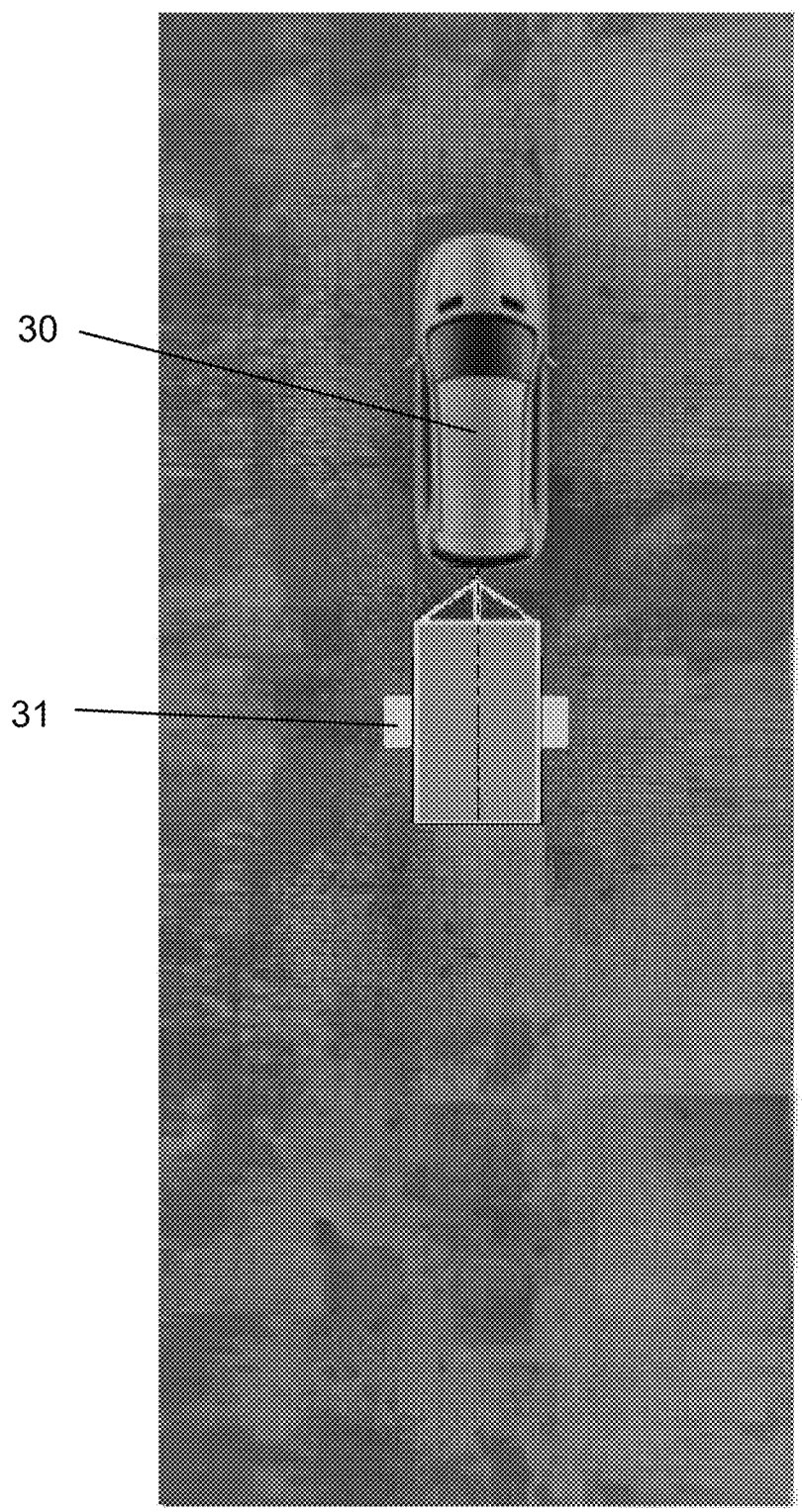
FIG. 3 is a plan view of a vehicle towing a trailer.
Figure 4:
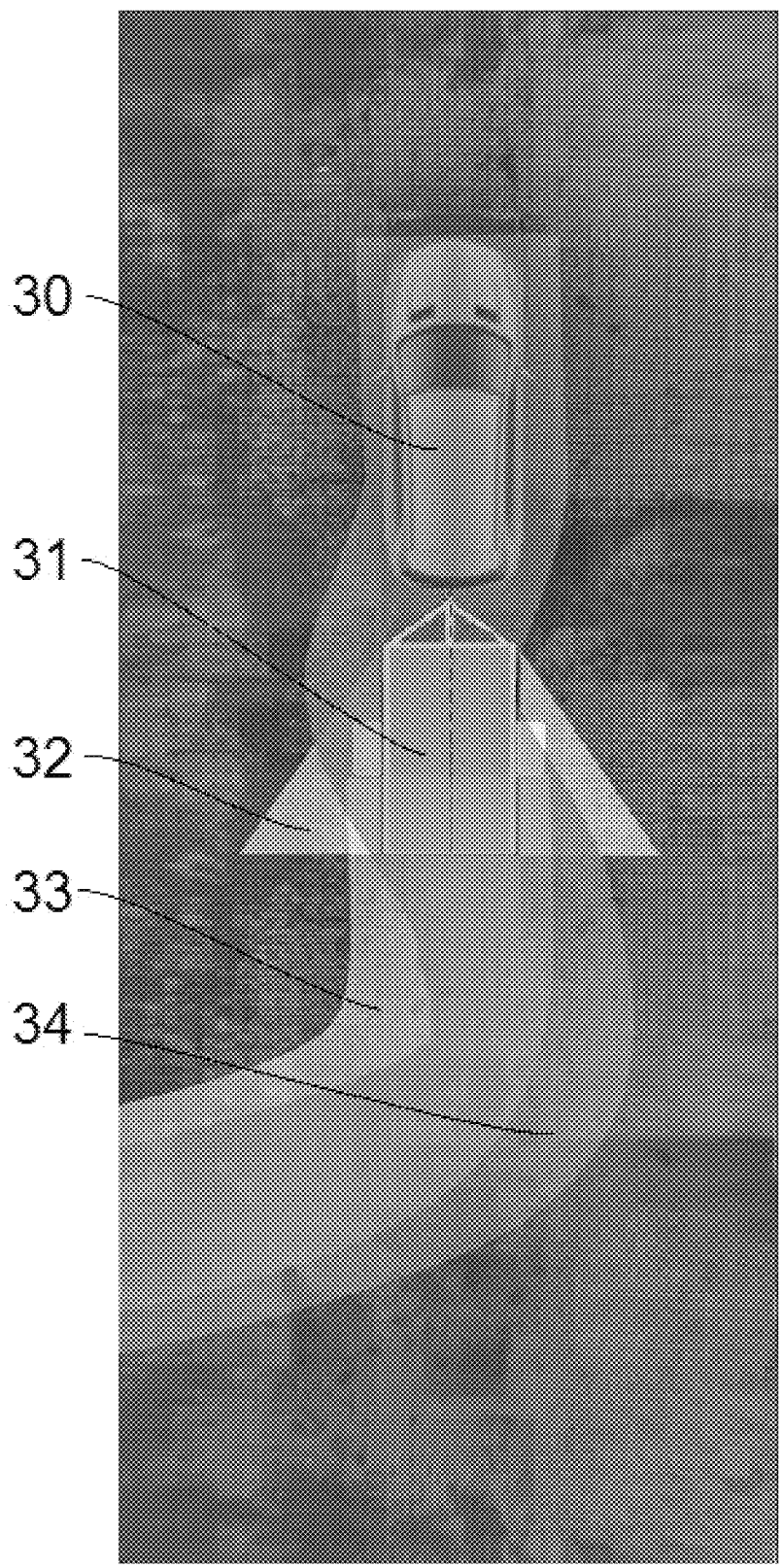
FIG. 4 is a plan view similar to FIG. 3, showing paths of the vehicle and trailer during a rearward turning maneuver.

In accordance with an aspect of the present invention, although areas which are (still) not encompassed by any camera as in the above cited U.S. Publication No. US-2014-0340510 may not be showable on a real time top view generated image, the mapping distance between the trailer camera (or cameras) image(s) and the images captured by the vehicle cameras may be a plausible distance when using a calibrated trailer camera. The mapping may occur in a machine vision system while the human interface may be a top scene view with the ego vehicle and the trailer in it (such as shown in FIGS. 3 and 4). FIG. 3 shows the detected environmental scene with the vehicle overlay 30 of the vehicle and the trailer overlay 31 in it. FIG. 4 shows additionally an overlay of an area inserted to the real time image by historical data (non-real time) content 32, since it is not captured by any sensor or camera. Overlays of a planned vehicle reversing path 34 and the trailer's reversing path 33 are inserted as well. The trailer and the vehicle may be overlays (augmented) having a true scale relative to the augmented vehicle and the real environmental scene, while the environmental scene may be generated non augmented from camera data and optionally other vehicle sensor's data (as discussed as optional under use of the 'Environment and Object map' generation using the sensor processing suggested in U.S. Publication No. US-2015-0344028). Optionally, the areas which are not encompassed by any of the four (or more) surround view vision cameras or trailer camera (or cameras) may be filled by a non-real time image patch out of the earlier detected scene's map system memory for being presented to the driver, such as by using aspects of the systems described in the above cited U.S. Publication No. US-2014-0160276. Optionally, that non-real time scene content (such as the scene area that is not in sensor range or that has a too low confidence level (such as, for example, areas in range of RGB cameras which are in darkness or, for example, ultrasound sensors in front of grass in the sensor range that is waving in the wind)) may be highlighted in any suitable manner, such as partially darkening, applying a blinking or colored overlay or by having blinking boundaries, since the non-real time space may be good for assuming the drivable (static) space but may lead a driver to overlook dynamic scene components such as a person or vehicle which may have stepped or drove into that maneuvering area which may be hazardous for that person, such as can be understood with reference to FIG. 4.

Figure 2:
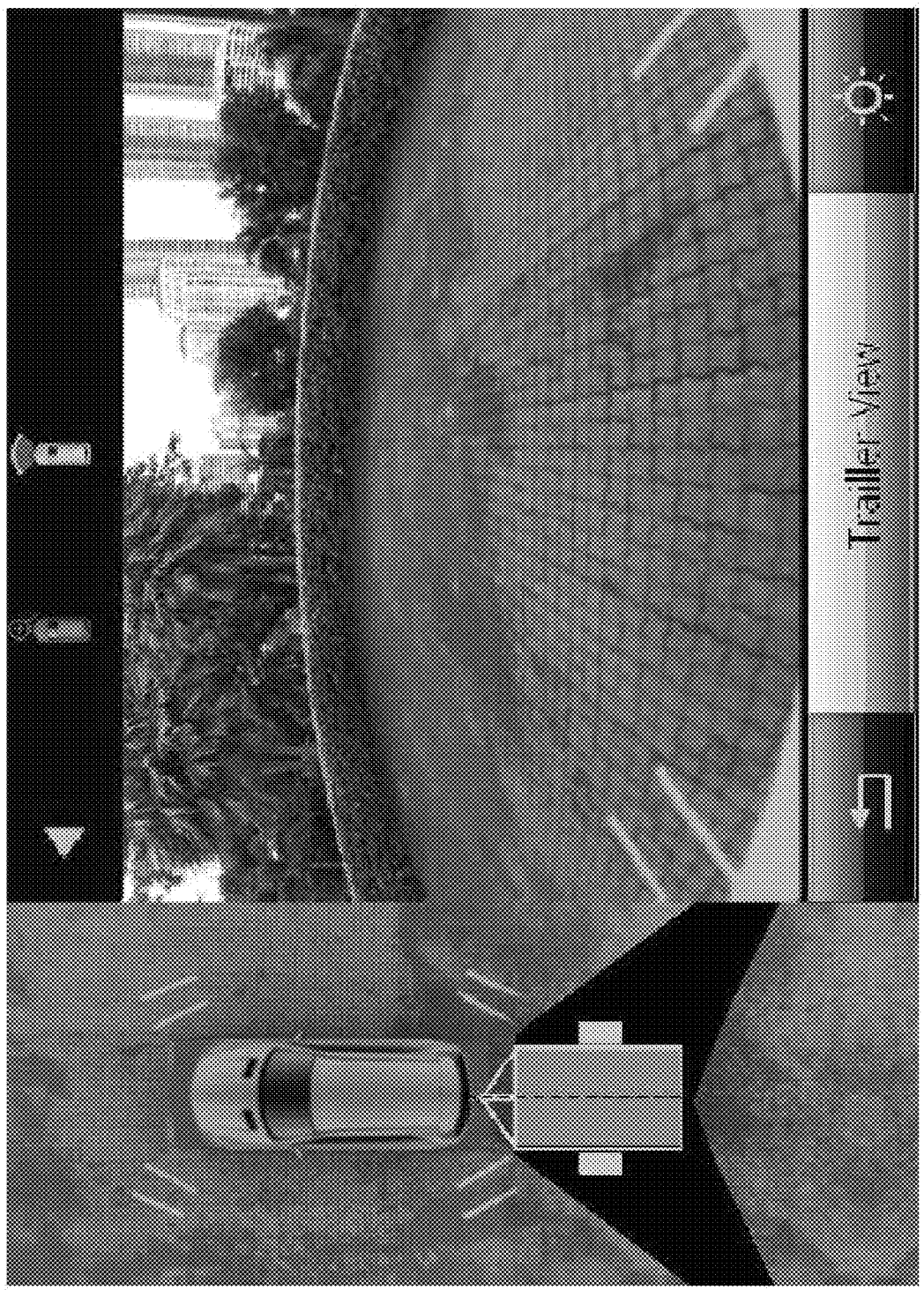
FIG. 2 is an image of a display screen displaying images in accordance with the present invention.

In the customer interface described in U.S. Publication No. US-2014-0340510, and such as shown in FIG. 2 (which corresponds to FIG. 40 of U.S. Publication No. US-2014-0340510), it desirable to have some area between the vehicle rear camera and the trailer camera within the top view image showing voids or black bars in the top view image display mode (with vehicle plus trailer) between the areas encompassed by the vehicle cameras and the area encompassed by the trailer camera since the trailer camera was not calibratable with the vehicle cameras.

Optionally, automated trailer parking or ramp docking DAS may be realized by using an optimal control algorithm under use of a cost minimization function, optionally having a two stage path planner having a first planning stage with a geometrical constructed path planning and a consecutive stage running an optimal control minimization algorithm, which is for smoothing the path and reducing set point extreme values, similar to that suggested in U.S. patent application Ser. No. 15/206,801, filed Jul. 11, 2016 and published Jan. 19, 2017 as U.S. Publication No. US-2017-0015312, and/or U.S. Publication No. US-2015-0344028, which are hereby incorporated herein by reference in their entireties. Known trailer assistant systems allow the user to navigate a trailer (that is hooked on a propelling or driven vehicle) rearwardly in a curvature controlled manner. In general, trailers behave unstably when being pushed rearwardly. Also, skilled drivers are challenged when backing up vehicle-trailer-trains. Curvature controlling trailer assist systems ease the task by controlling the vehicle's steering wheels in a manner that the trailer is describing a curve in a radius actually set by the user's input, such as described in U.S. Publication No. US-2012-0271515.

It is known that the trailer's path and/or the vehicle's path according to the actual set point is augmented on the vehicle's vision system, such as, for example, via a top view vision system. Since naturally the rear vehicle camera is mostly blocked by the trailer which is being towed by the vehicle, the path to the area the trailer is moving towards is not visible by the vehicle rear camera. To overcome this matter, some OEMs offer the solution that the vehicle vision is transferred to a smart phone and also the vehicle's curvature and longitudinal control is implemented on the smart phone. The user sets the curvature setpoint of the trailer and steers the speed of the vehicle-trailer train. Since the user can exit the vehicle and watch the scene from aside, possibly invisible to any towing vehicle camera, he or she can avoid backing the trailer into a collision or harming someone.

DE 000010128792 discloses a collision avoidance and warning system of drive trains with trailers for maneuvering forward or backwardly. In there it is disclosed that required driving space for the towing vehicle and the trailer all together gets predicted. That system's prediction does not include trajectory planning, the prediction is limited to one circle segment and is based on holding the actual trailer steering angle. The reality is different when maneuvering a trailer forwardly or rearwardly in curves for reaching a specific spot or for avoiding obstacles.

For easier prediction of the last trailer's path of multi-link trains, the curves can be planned in circle segments optionally. In DE 102008043675, a control for controlling the rearward traveling path of multiple links attached to a leading towing vehicle with just the towing vehicle's front wheels controllable was suggested. The control mathematics were more or less poor or not executable in practice since a couple of correction constants were to be determined. Nonholonomic motion path planning of n-trailers by using the Gourset normal form was discussed in IEEE Transactions on Automatik Control, Vol. 40, No. 5, May 1995. Another approach capable to avoid dynamic obstacles was shown by Lamiraux in Springer Path Optimization for Nonholonomic Systems: Application to Reactive Obstacle Avoidance and Path Planning, 2003.

The vehicle-trailer train path planner of the present invention may utilize one of the path planning strategies as described in the above cited references or one similar to the planner and control recently published in International Publication No. WO 2015/001066. International Publication No. WO 2015/001066 though may lack executability by a person skilled in the subject since it does not include any disclosure on how to calibrate the trailer cameras or sensors to the vehicle system so that the control can steer the trailer along a designated path automatically. Without calibration, the scene detection may fail, the path planning, which is depending on a correct scene detection, may fail and the maneuver execution may fail because the path will not match to the real scene, although the path planner itself may work correctly (but using wrong input data).

Departing from the prior art, including International Publication No. WO 2015/001066, the system of the present invention uses the trailer camera not just to determine that the trailer is approaching possibly hazardous objects but to assimilate the visual scene information to the vehicle's scene sensor processing (master-) system. The trailer cameras are calibrated essentially by motion flow (such as to correct for improper installation, such as being tilted, rolled or yawed or being off center), such as similar to the calibration of the surround vision system's fish eye cameras (14a, 14b, 14c and 14d) attached to the (towing) vehicle such as shown in FIG. 1. The calibration may require the vehicle-trailer train to be in motion, for having motion flow. The scenery may require some texture or pattern so that the system has some fix points to track and motion assess. The texture or pattern should be naturally given when the train is driven in natural environment (such as given by trees, buildings, vehicles, and/or the like in the environment surrounding the vehicle and trailer). The initial test drive for initializing the trailer camera in coordinates to the tow vehicle born coordinate (map-) system may be comparably short, such as about 10 m or thereabouts. The additionally required trailer angle detection system may be (towing-) vehicle rear camera based or vehicle rear end ultrasound sensor (possibly ultrasound sensor array) based or may be another direct mounted angle sensor based or contactless sensor based system capable of detecting the trailer angle against the towing vehicle, optionally having a dedicated target (sticker) on the trailer to enable the trailer angle detection system to function, or optionally targetless trailer detection may be incorporated in the automated trailer path control system of the present invention.

Optionally, the trailer path control system of the present invention may additionally be capable of avoiding hazards with dynamic objects such as pedestrians walking through the pursued trailer destination or parking spot or the path to it. The system's algorithm may have a threshold time which alters the classification of a moving object to a static object when it comes to a stop over a certain time (such as, for example, when another vehicle within the environmental scene [map] stops). While the system may just wait until a moving object, such as, for example, a pedestrian or the like, has left the trailer train destination path, the system may optionally redo the path planning in case the static map has changed, such as when another vehicle has occupied (and stopped) a part of the free space that was part of the destination path originally.

The system may utilize aspects of the trailering or trailer angle detection systems described in U.S. Pat. Nos. 9,086, 261 and/or 6,690,268, and/or U.S. Publication Nos. US-2015-0217693; US-2014-0160276; US-2014-0085472 and/or US-2015-0002670, and/or U.S. provisional applications, Ser. No. 62/303,546, filed Mar. 4, 2016, and/or Ser. No. 62/290,167, filed Feb. 2, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driving assist system, said vehicular driving assist system comprising:
a plurality of vehicle cameras disposed at a vehicle and having respective fields of view exterior of the vehicle, wherein said plurality of vehicle cameras includes a rear backup camera disposed at a rear portion of the vehicle and viewing at least rearward of the vehicle;
at least one trailer camera disposed at a trailer hitched to the vehicle and having a respective field of view exterior of the trailer;
an image processor operable to process image data captured by said plurality of vehicle cameras and by said at least one trailer camera;
wherein, responsive to processing of image data captured by said plurality of vehicle cameras and by said at least one trailer camera during a backing up maneuver of the trailer hitched to the vehicle, said vehicular driving assist system determines objects rearward of the trailer that are present in the field of view of said at least one trailer camera;
a display screen disposed in the vehicle for viewing by a driver of the vehicle, wherein said display screen displays video images derived from image data captured by at least one camera selected from the group consisting of (i) said plurality of vehicle cameras and (ii) said at least one trailer camera;
wherein said vehicular driving assist system determines a reversing path for the vehicle and trailer to follow to assist the driver in backing up the trailer;
wherein said vehicular driving assist system generates a graphic overlay at said display screen overlaying the displayed video images, the graphic overlay indicating the determined reversing path for the driver to follow in backing up the trailer;
wherein, during the backing up maneuver of the trailer hitched to the vehicle along the determined reversing path, said vehicular driving assist system determines an object rearward of the trailer; and
wherein, during the backing up maneuver of the trailer hitched to the vehicle along the determined reversing path, and responsive to determination of the object rearward of the trailer via processing of image data captured by at least said at least one trailer camera, said vehicular driving assist system (i) determines an adjusted reversing path to avoid the object and (ii) adjusts the graphic overlay to indicate the adjusted reversing path of the vehicle and the trailer for the driver to follow in backing up the trailer.

2. The vehicular driving assist system of claim 1, wherein said vehicular driving assist system controls a steering system of the vehicle to steer the vehicle to back up the trailer along the determined reversing path.

3. The vehicular driving assist system of claim 1, wherein, responsive to processing of image data captured by said plurality of vehicle cameras and by said at least one trailer camera while the vehicle is backing up the trailer, said vehicular driving assist system initializes said at least one trailer camera in coordinates that correspond to coordinates of said plurality of vehicle cameras.

4. The vehicular driving assist system of claim 1, wherein said vehicular driving assist system calibrates said at least one trailer camera responsive at least in part to a determination of a trailer angle of a longitudinal axis of the trailer relative to a longitudinal axis of the vehicle.

5. The vehicular driving assist system of claim 4, wherein said vehicular driving assist system determines the trailer angle responsive at least in part to image processing of image data captured by at least said rear backup camera of said plurality of vehicle cameras.

6. The vehicular driving assist system of claim 4, wherein said vehicular driving assist system determines the trailer angle responsive at least in part to image processing of image data captured by at least said rear backup camera of said plurality of vehicle cameras and image data captured by said at least one trailer camera.

7. The vehicular driving assist system of claim 1, wherein the at least one trailer camera at least comprises a rearward viewing trailer camera viewing at least rearward of the trailer.

8. The vehicular driving assist system of claim 1, wherein, responsive to the determination of the object rearward of the trailer, said vehicular driving assist system generates an alert to alert the driver of the vehicle.

9. The vehicular driving assist system of claim 1, wherein, responsive to determination of the object rearward of the trailer, said vehicular driving assist system controls a braking system of the vehicle.

10. The vehicular driving assist system of claim 1, wherein, responsive to determination of the object rearward of the trailer, said vehicular driving assist system controls a steering system of the vehicle.

11. The vehicular driving assist system of claim 1, wherein said vehicular driving assist system utilizes a trailer identifying and angle detection algorithm.

12. The vehicular driving assist system of claim 1, wherein said vehicular driving assist system determines the reversing path using a two stage path planner.

13. The vehicular driving assist system of claim 12, wherein the two stage path planner comprises a geometric planning with consecutive optimal control minimization algorithm.

14. A vehicular driving assist system, said vehicular driving assist system comprising:
a plurality of vehicle cameras disposed at a vehicle and having respective fields of view exterior of the vehicle, wherein said plurality of vehicle cameras includes a rear backup camera disposed at a rear portion of the vehicle and viewing at least rearward of the vehicle;
a rearward viewing trailer camera disposed at a rear portion of a trailer hitched to the vehicle, said rearward viewing trailer camera viewing at least rearward of the trailer;
an image processor operable to process image data captured by said plurality of vehicle cameras and by said rearward viewing trailer camera;
wherein, responsive to processing of image data captured by said plurality of vehicle cameras and by said rearward viewing trailer camera during a backing up maneuver of the trailer hitched to the vehicle, said vehicular driving assist system determines objects rearward of the trailer that are present in the field of view of said rearward viewing trailer camera;
a display screen disposed in the vehicle for viewing by a driver of the vehicle, wherein said display screen displays video images derived from image data captured by at least one camera selected from the group consisting of (i) said plurality of vehicle cameras and (ii) said rearward viewing trailer camera;
wherein said vehicular driving assist system determines a reversing path for the vehicle and trailer to follow to assist the driver in backing up the trailer;
wherein said vehicular driving assist system generates a graphic overlay at said display screen overlaying the displayed video images, the graphic overlay indicating the determined reversing path;

wherein said vehicular driving assist system controls a steering system of the vehicle to steer the vehicle to back up the trailer along the determined reversing path;

wherein, during the backing up maneuver of the trailer hitched to the vehicle along the determined reversing path, said vehicular driving assist system determines an object rearward of the trailer; and wherein, during the backing up maneuver of the trailer hitched to the vehicle along the determined reversing path, and responsive to determination of the object rearward of the trailer via processing of image data captured by at least said rearward viewing trailer camera, said vehicular driving assist system (i) determines an adjusted reversing path to avoid the object, (ii) adjusts the graphic overlay to indicate the adjusted reversing path of the vehicle and the trailer and (iii) controls the steering system of the vehicle to steer the vehicle to back up the trailer along the adjusted reversing path.

15. The vehicular driving assist system of claim 14, wherein, responsive to processing of image data captured by said plurality of vehicle cameras and by said rearward viewing trailer camera while the vehicle is backing up the trailer, said vehicular driving assist system initializes said rearward viewing trailer camera in coordinates that correspond to coordinates of said plurality of vehicle cameras.

16. The vehicular driving assist system of claim 14, wherein, responsive to the determination of the object rearward of the trailer, said vehicular driving assist system generates an alert to alert the driver of the vehicle.

17. The vehicular driving assist system of claim 14, wherein, responsive to determination of the object rearward of the trailer, said vehicular driving assist system controls a braking system of the vehicle.

18. A vehicular driving assist system, said vehicular driving assist system comprising:

a plurality of vehicle cameras disposed at a vehicle and having respective fields of view exterior of the vehicle, wherein said plurality of vehicle cameras includes a rear backup camera disposed at a rear portion of the vehicle and viewing at least rearward of the vehicle;

a rearward viewing trailer camera disposed at a rear portion of a trailer hitched to the vehicle, said rearward viewing trailer camera viewing at least rearward of the trailer;

an image processor operable to process image data captured by said plurality of vehicle cameras and by said rearward viewing trailer camera;

wherein, responsive to processing of image data captured by said plurality of vehicle cameras and by said rearward viewing trailer camera during a backing up maneuver of the trailer hitched to the vehicle, said vehicular driving assist system determines objects rearward of the trailer that are present in the field of view of said rearward viewing trailer camera;

wherein said vehicular driving assist system calibrates said rearward viewing trailer camera responsive at least in part to a determination of a trailer angle of a longitudinal axis of the trailer relative to a longitudinal axis of the vehicle;

a display screen disposed in the vehicle for viewing by a driver of the vehicle, wherein said display screen displays video images derived from image data captured by at least one camera selected from the group consisting of (i) said plurality of vehicle cameras and (ii) said rearward viewing trailer camera;

wherein said vehicular driving assist system determines a reversing path for the vehicle and the trailer to follow to assist the driver in backing up the trailer;

wherein said vehicular driving assist system generates a graphic overlay at said display screen overlaying the displayed video images, the graphic overlay indicating the determined reversing path for the driver to follow in backing up the trailer;

wherein, during the backing up maneuver of the trailer hitched to the vehicle along the determined reversing path, said vehicular driving assist system determines an object rearward of the trailer; and wherein, during the backing up maneuver of the trailer hitched to the vehicle along the determined reversing path, and responsive to determination of the object rearward of the trailer via processing of image data captured by at least said rearward viewing trailer camera, said vehicular driving assist system (i) determines an adjusted reversing path to avoid the object and (ii) adjusts the graphic overlay to indicate the adjusted reversing path for the driver to follow in backing up the trailer.

19. The vehicular driving assist system of claim 18, wherein said vehicular driving assist system controls a steering system of the vehicle to steer the vehicle to back up the trailer along the determined reversing path.

20. The vehicular driving assist system of claim 18, wherein said vehicular driving assist system determines the trailer angle responsive at least in part to image processing of image data captured by at least said rear backup camera of said plurality of vehicle cameras.

21. The vehicular driving assist system of claim 18, wherein said vehicular driving assist system determines the trailer angle responsive at least in part to image processing of image data captured by at least said rear backup camera of said plurality of vehicle cameras and image data captured by said rearward viewing trailer camera.

22. The vehicular driving assist system of claim 18, wherein, responsive to the determination of the object rearward of the trailer, said vehicular driving assist system generates an alert to alert the driver of the vehicle.

23. The vehicular driving assist system of claim 18, wherein, responsive to determination of the object rearward of the trailer, said vehicular driving assist system controls a braking system of the vehicle.

\* \* \* \* \*